United States Patent
Soliven et al.

(10) Patent No.: US 11,801,783 B2
(45) Date of Patent: Oct. 31, 2023

(54) HEADREST

(71) Applicant: Adient US LLC, Plymouth, MI (US)

(72) Inventors: Reinier Soliven, Oakland, MI (US); John Gomez, Howell, MI (US); Joseph Gasko, Commerce Township, MI (US); James Biebel, Milford, MI (US)

(73) Assignee: Adient US LLC, Plymouth, MI (US)

( * ) Notice: Subject to any disclaimer, the term of this patent is extended or adjusted under 35 U.S.C. 154(b) by 0 days.

(21) Appl. No.: 17/647,178

(22) Filed: Jan. 6, 2022

(65) Prior Publication Data

US 2022/0212583 A1 Jul. 7, 2022

Related U.S. Application Data

(60) Provisional application No. 63/134,224, filed on Jan. 6, 2021.

(51) Int. Cl.
*B60N 2/80* (2018.01)

(52) U.S. Cl.
CPC .......... *B60N 2/80* (2018.02); *B60N 2002/899* (2018.02)

(58) Field of Classification Search
CPC ............................ B60N 2/80; B60N 2002/899
See application file for complete search history.

(56) References Cited

U.S. PATENT DOCUMENTS

| | | | |
|---|---|---|---|
| 8,322,790 B2 | 12/2012 | Tscherbner | |
| 8,573,701 B2 * | 11/2013 | Yetukuri | B60N 2/865 297/216.12 |
| 9,511,696 B2 * | 12/2016 | Wang | B60N 2/859 |
| 9,731,637 B2 * | 8/2017 | Humer | B60N 2/838 |
| 9,950,654 B1 * | 4/2018 | Contreras | B60N 2/6009 |
| 11,027,634 B2 * | 6/2021 | Kondrad | B60N 2/5825 |
| 2006/0125297 A1 | 6/2006 | Orizaris | |
| 2008/0164730 A1 * | 7/2008 | Watson | B60N 2/809 297/216.12 |
| 2015/0375648 A1 * | 12/2015 | Navarro | B29C 44/1266 297/391 |
| 2016/0167551 A1 * | 6/2016 | Okamoto | B60N 2/7017 297/391 |
| 2019/0366894 A1 | 12/2019 | Haubrich et al. | |

FOREIGN PATENT DOCUMENTS

| | | |
|---|---|---|
| DE | 202005014217 U1 | 2/2006 |
| DE | 102007048786 A1 | 10/2008 |
| DE | 202007013283 U1 | 2/2009 |
| DE | 102011077840 A1 | 12/2012 |
| WO | 2005118336 A1 | 12/2005 |
| WO | 2011153384 A1 | 12/2011 |
| WO | 2013135214 A1 | 9/2013 |

\* cited by examiner

*Primary Examiner* — Philip F Gabler
(74) *Attorney, Agent, or Firm* — Marshall & Melhorn, LLC

(57) ABSTRACT

A headrest for a vehicle seat may have a first component constructed of an expanded polypropylene material. The first component may have a covering applied to at least a portion thereof. The headrest may also have a second component constructed of the expanded polypropylene material. The second component may have a front portion with a complementary shape to the first component and may least partially interface with the first component. The second component may have a coating disposed on at least a portion thereof.

18 Claims, 3 Drawing Sheets

HEADREST

CROSS-REFERENCE TO RELATED APPLICATION

This application is entitled to claim the benefit of, and claims priority to, U.S. provisional patent application Ser. No. 63/134,224 filed Jan. 6, 2021, the entire disclosure of which is incorporated herein by reference.

FIELD

The presently disclosed subject matter relates to a headrest for a seat, and more particularly to a headrest for a vehicle seat.

BACKGROUND

Vehicles, including passenger-type vehicles, include seats for occupants. The seats often have headrests for both passenger comfort and safety. Prior art headrest designs can be complex structures with complex connection mechanisms to the seat. The complexity of the prior art designs contributes to several disadvantages, including at least their high cost and weight.

In view of the disadvantages associated with the prior art designs, it would be advantageous to have a headrest that was lightweight, as well as simple in its design so it was easy and cost effective to manufacture. It would also be advantageous for the new headrest to be at least as comfortable and safe, if not more, than the prior art designs.

SUMMARY

In concordance and agreement with the present invention, a headrest for a vehicle that is lightweight and simple in its design yet easy and cost effective to manufacture while at least as comfortable and safe, if not more, than the prior art designs, has surprisingly been discovered.

In one embodiment, a headrest for a vehicle, comprises: at least one component configured to support a head of an occupant, wherein the at least one component is formed of an expanded polypropylene material; and a covering wrapped around at least a portion of the at least one component, wherein an attachment of the covering to the at least one component is hidden from view.

As aspects of certain embodiments, the at least one component includes a core having a front portion, a rear portion, an upper portion, a lower portion, and a pair of side portions.

As aspects of certain embodiments, the front portion further includes a concave region formed therein.

As aspects of certain embodiments, the headrest further comprises a cushioning member disposed on the front portion of the at least one component.

As aspects of certain embodiments, the rear portion includes a plurality of facets formed therein.

As aspects of certain embodiments, the rear portion includes a pair of first facets, a pair of second facets, and a third facet, wherein each of the second facets connected to a respective one of the first facets, and wherein the third facet is connected to the second facets.

As aspects of certain embodiments, the covering is formed of at least of a fabric material, a leather material, a man-made material, and a natural material.

As aspects of certain embodiments, the headrest further comprises another covering disposed on a remaining portion of the at least one component.

As aspects of certain embodiments, the headrest further comprises a guide structure disposed in the at least one component for coupled to a seat back assembly of the vehicle.

In another embodiment, a headrest for a vehicle, comprises: a first component configured to support a head of an occupant; and a second component configured to cooperate with the first component, wherein at least one of the first component and the second component is formed of an expanded polypropylene material.

As aspects of certain embodiments, at least one of the first component and the second component includes a core having a front portion, a rear portion, an upper portion, a lower portion, and a pair of side portions.

As aspects of certain embodiments, the front portion of the first component further includes a concave region formed therein.

As aspects of certain embodiments, the headrest further comprises a cushioning member disposed on the front portion of the first component.

As aspects of certain embodiments, the rear portion of the first component includes a plurality of facets formed therein.

As aspects of certain embodiments, a front portion of the second component includes a plurality of facets formed therein.

As aspects of certain embodiments, the headrest further comprises a covering wrapped around at least a portion of the first component, wherein an attachment of the covering to the first component is hidden from view by a portion of the second component.

As aspects of certain embodiments, the headrest further comprises another covering disposed on a portion of the second component.

As aspects of certain embodiments, wherein the covering disposed on the portion of the second component is at least one of a coating and a film.

As aspects of certain embodiments, the headrest further comprises a guide structure disposed in at least one of the first component and the second component, wherein the guide structure is configured to couple the headrest to a seat back assembly of the vehicle.

In yet another embodiment, a headrest for a vehicle, comprises: a first component includes a first core having a first portion and an opposite second portion, wherein the first portion includes a concave region, and wherein a covering is applied over at least the concave region; and a second component includes a second core having a first portion and an opposite second portion, wherein the first portion of the second component is configured to at least partially interface with the second portion of the first component, wherein the second portion of the second component has a coating disposed thereon, and wherein at least one of the first component and the second component is formed from an expanded polypropylene material.

BRIEF DESCRIPTION OF THE DRAWINGS

The above, as well as other advantages, will become readily apparent to those skilled in the art from the following detailed description when considered in the light of the accompanying drawings in which.

DETAILED DESCRIPTION

Figure 1:
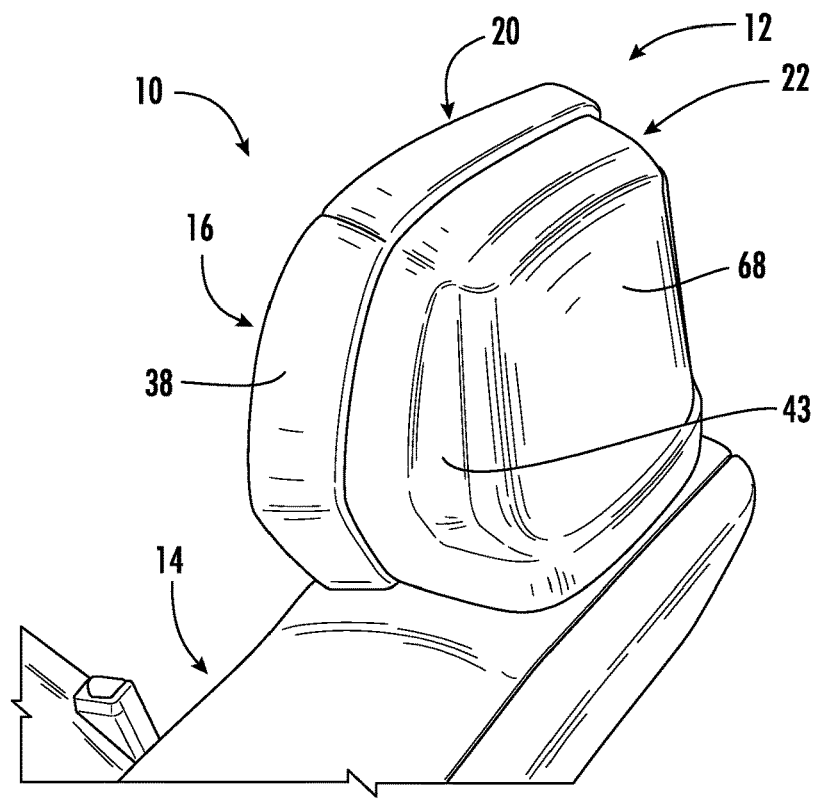
FIG. 1 is a rear, perspective view of a headrest 12 according to an embodiment of the presently disclosed subject matter, wherein a covering has been removed.
Figure 2:
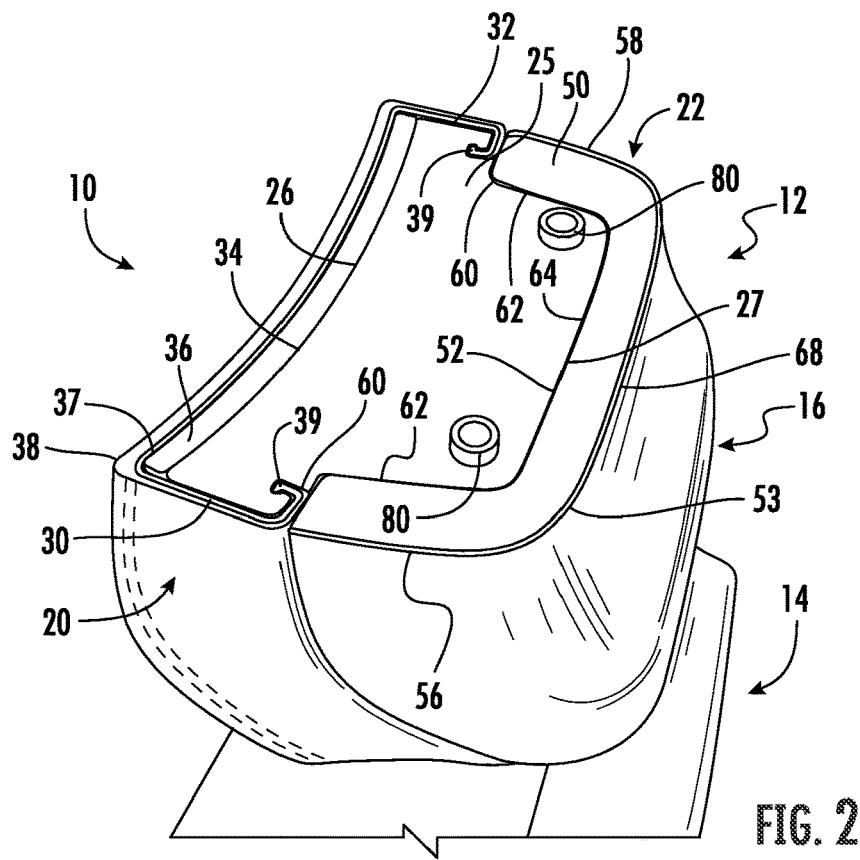
FIG. 2 is a rear, perspective view of the headrest 12 of FIG. 1, showing a section of the headrest 12 taken along A-A in FIG. 1.

It is to be understood that the device may assume various alternative orientations and step sequences, except where expressly specified to the contrary. It is also to be understood that the specific devices and processes illustrated in the attached drawings, and described in the following specification are simply exemplary embodiments. Hence, specific dimensions, directions or other physical characteristics relating to the embodiments disclosed are not to be considered as limiting, unless the expressly stated otherwise.

Turning now to FIGS. 1-5, a vehicle seat 10 having a headrest 12 according to an embodiment of the presently disclosed subject matter is depicted. Although FIGS. 1-5, and the following description, illustrate and discuss the headrest 12 being configured for the vehicle seat 10, it should be appreciated that the headrest 12 may be employed in other seating applications, if desired. The vehicle seat 10 may further include a seat back assembly 14 configured to be coupled to the headrest 12 and a seat base assembly (not shown) configured to be coupled to the seat back assembly 14.

In certain embodiments, the headrest 12 may comprise a multi-piece construction. It is within the scope of the present disclosure, however, to make essentially the same headrest 12 in a one-piece, integrally formed and unitary construction. In some embodiments, the headrest 12 may be entirely or substantially symmetrical about an axis, such as an axis that extends from a front to a rear of the headrest 12. In other words, the headrest 12 may have side-to-side symmetry, but perhaps not, front to back symmetry.

As shown in FIGS. 1-5, the headrest 12 may comprise a first component 20 and at least a second component 22. It should be appreciated that the headrest 12 may comprise more or less components than shown. In one embodiment, the components 20, 22 may be located together and joined at an intersection 24. In other embodiments, the components 20, 22 may be at least partially nested or stacked.

The first component 20 may be located on a front side of the headrest 12, while the second component 22 may be located on a rear side of the headrest 12. The terms front and rear are used as a general orientations associated with a front side of the vehicle seat 10 in which a passenger or passengers might be located or seated, while the rear side may be the opposite from the front.

In certain embodiments, at least one of the first component 20 and the second component 22 may be constructed at least partially of a foamed material including, but not limited to, an expanded polypropylene material. In one embodiment, the first component 20 and the second component 22 may be substantially entirely formed from expanded polypropylene material. Using the polypropylene material entirely or substantially for at least one of the first and second components 20, 22 may be advantageous for many reasons. Among those reasons is that headrest 12 is very lightweight, which may assist in reducing vehicle weight and increasing vehicle fuel economy. The polypropylene material is also readily available, inexpensive, and easy to work with, thus manufacturing costs can be reduced compared with the prior art designs. Further, the polypropylene material may also function as a cushioning material that protects the occupant in the seat as well as other occupants in the vehicle. By way of one example, the polypropylene material may deform or even break upon impacts of a certain degree. Such deformation or breakage of the polypropylene material during impact may function as an energy absorber, such as when the head of the occupant comes into contact with the headrest 12 during a collision, crash or other impact. Thus, the headrest 12 may provide some protection to the occupant's head during a deceleration of the vehicle that is dangerously too rapid.

The headrest 12 also may protect other occupants in the vehicle in a similar manner. For instance, if an occupant in the vehicle is located behind a seat with the headrest 12 described and depicted herein, the headrest 12, wherein the second component 22 is also constructed of polypropylene, provides the same advantageous protections to a rear occupant should they come into contact with the headrest 12. Thus, other occupants in the vehicle, in addition to the occupant in the seat with the headrest 12, are also protected.

Figure 4:
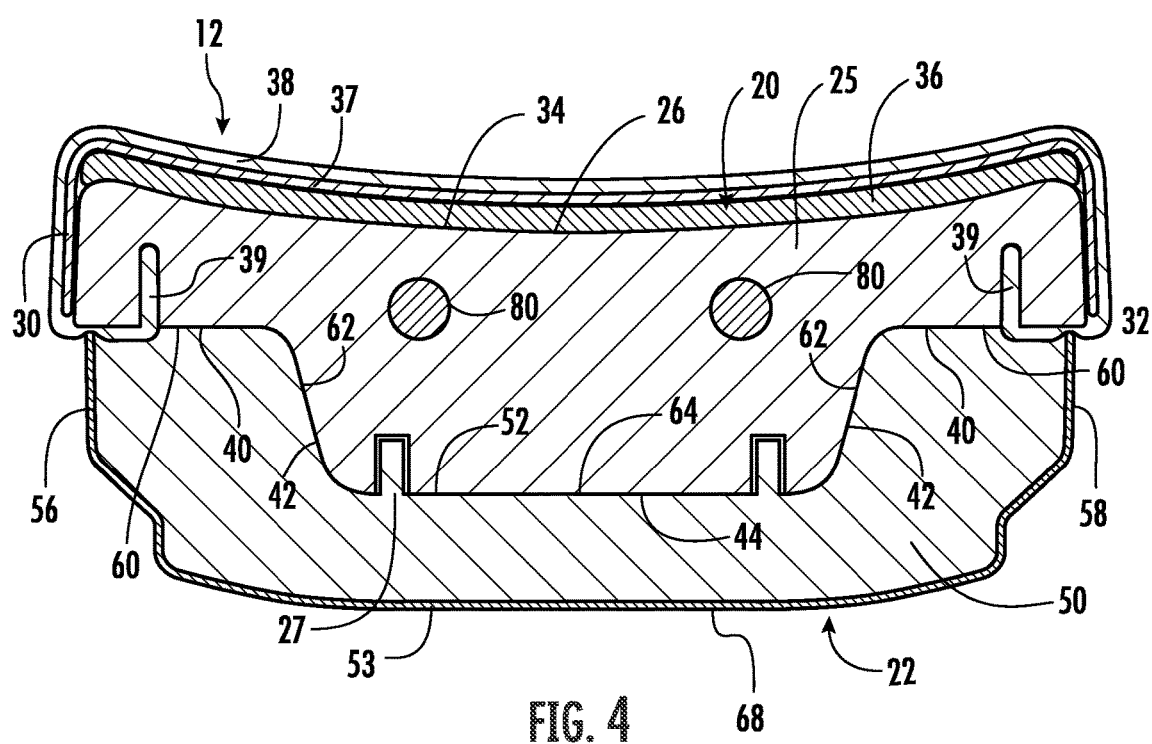
FIG. 4 is a cross-sectional view of the headrest 12 of FIGS. 1-3.

As more clearly shown in FIG. 4, the first component 20 may include a first core 25 having a front portion 26, a rear portion 27, an upper portion 28, a lower portion 29, and opposing first and second side portions 30, 32. In certain embodiments, the front and rear portions 26, 27 may be generally parallel to one another. The upper and lower portions 28, 29 may be generally parallel to one another. The side portions 30, 32 may also be generally parallel one another. Each of the side portions 30, 32 may extend from the front portion 26 to the rear portion 28 and from the upper portion 28 to the lower portion 29. It is understood that each of the side portions 30, 32 may have the same length, height, and angle relative to the front portion 26, as desired.

In certain embodiments, a surface of the front portion 26 of the first core 25 may be generally planar. In a preferable embodiment, the front portion 26 may include a generally concave region 34. The concave region 34 may contribute to a general cradling effect for a head of an occupant, which leads to increased comfort for the occupant by centering and holding the head. It is understood that the concave region 34 may laterally extend along an entire or partial length of the front portion 26. It is further understood that the concave region 34 may also transversely extend along an entire or partial height of the front portion 26. It is appreciated that the front portion 26 may include other features to enhance the comfort for the occupant, if desired.

An additional cushion material 36, such as a foam material, may be located at least partially over the surface of the front portion 26 of the headrest 12. Preferably, the cushion material 36 is located entirely over the concave region 34 of the front portion 26. The cushion material 36 may further enhance the comfort for the occupant.

It is also permissible for the front portion 26 to be provided with a lamination 37. The lamination 37 may be in addition to the cushion material 36. In certain embodiments, the lamination 37 may be a substrate for attachment of other components and features of the headrest 12. In a non-limiting example, the lamination 37 may be a substrate for a covering 38 of the headrest 12 described hereinafter. It is understood that the lamination 37 may be any suitable material as desired. Further, the lamination 37 may be the same as or in addition to the covering 38.

The trim or covering 38 may be located at least partially over the forward portion 26 of the first component 20. The covering 38 may also extend at least over the side portions 30, 32 of the first component 20. As more clearly shown in FIG. 3, the covering 38 includes a plurality of flaps 41 which may be wrapped around, or otherwise attached, to the rear portion 28 of the first component 20 to secure the covering 38 thereto. In certain embodiments, the covering 38 is secured to the first component 20 by at least one attachment element 39. As a non-limiting example, the at least one attachment element 39 may be an anchor-type fastener that connects with the covering 38 and extends or otherwise attaches to the first component 20. In certain embodiments, the at least one attachment element 39 is directly coupled to the covering 38 such as by a sewing process, for example. Various other types of attachment elements 39 may be employed to secure the covering 38 to the first component 20 as desired. In the embodiment shown in FIGS. 1-5, the at least one attachment element 39 may be connected to the rear portion 28, and more preferably disposed adjacent the upper and lower portions 28, 29 and the side portions 30, 32 of the first component 20 so it is hidden from view in a final assembled headrest 12. The covering 38 may be constructed of fabric, leather and/or other man-made or natural materials.

Locating the covering 38 over just the first component 20 has the advantage of being easier to apply than having to apply the covering 38 to the entire headrest 12. More particularly, the covering 38 can be wrapped about the first component 20 as described above and, as best seen in FIG. 3, whereas the prior art coverings had to be pulled down over an entire headrest, which resulted in wrinkles, and areas of the prior art coverings that were not fully supported underneath by the headrest, which gave the prior art coverings an ill-fitting appearance. Connection points of the prior art coverings to the headrest were also more difficult to hide.

In some embodiments, the rear portion 28 may comprise a single surface, but in other embodiments the rear portion 28 may comprise multiple surfaces and be multi-faceted. In some embodiments, the rear portion 28 may include one or more deep recessed inlets for air circulation or cooling. In still yet additional embodiments, the rear portion 28 may have sculpted in, or otherwise created or formed, features 43 for hand grips and finger areas if the occupant wanted to grab and adjust the headrest 12.

In the embodiment depicted in FIGS. 1-5, the rear portion 28 includes a multi-faceted surface. In a non-limiting example, the rear portion 28 may include first facets 40, second facets 42, and a third facet 44. As shown, each of the first facets 40 extends inwardly from a respective one of the side portions 30, 32 and extends generally parallel to the front portion 26. The first facets 40 may be of equal lengths and extend generally parallel to one another. It is understood, however, that each of the first facets 40 may have any length and extend at any angle relative to one another as desired.

The second facets 42, each directly connected to a respective one of the first facets 40, may extend rearwardly. As such, the second facets 42 may extend generally transverse the first facets 40. The second facets 42 may be of equal lengths and extend generally parallel to one another. In certain embodiments, the second facets 42 may have a length greater than a length of the first facets 40. It is understood that each of the second facets 42 may have any length and extend at any angle relative to one another as desired.

Figure 3:
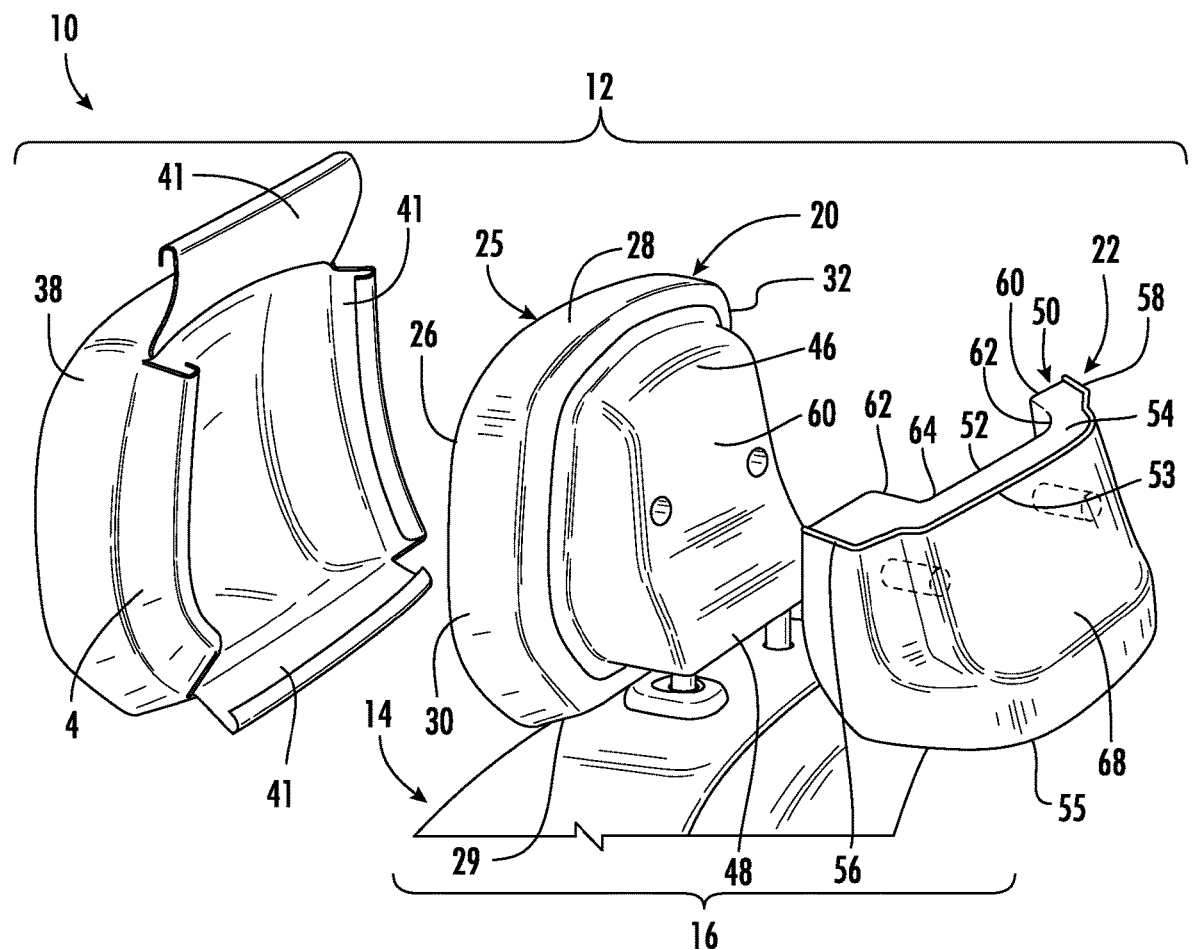
FIG. 3 a partially exploded perspective view of the headrest 12 of FIGS. 1 and 2.

The third facet 44, directly connected to both of the second facets 42, may form a rearmost surface of the rear portion 28 of the first core 25. The third facet 44 may extend generally parallel to the forward portion 26, but it may have a length shorter than the length of the forward portion 26. In some embodiments, the third facet 44 may have a length shorter than the length of the forward portion 26 by at least the combined lengths of the first facets 40. The third facet 44 may extend generally transverse to the second facets 42. It is understood that the third facet 44 may have any length and extend at any angle relative to the first and second facets 40, 42, respectively. The third facet 44 may be generally planar. In some embodiments, however, the third facet 44 may also have additional surfaces. One embodiment of the third facet 44 having additional surfaces is depicted in FIG. 3. In such embodiment shown in FIG. 3, the third facet 44 may have an upper region 46 and a lower region 48. The lower region 48 may extend rearwardly, such as at an angle, to a greater extent than the upper region 46. Each of the facets 40, 42, 44 may be connected to one another by angled transitions. In some embodiments, the angled transitions may be such as radiused inner and outer corners.

Referring now to FIG. 4, the second component 22 include a second core 50 having a front portion 52, a rear portion 53, an upper portion 54, a lower portion 55, and opposing first and second side portions 56, 58. The front portion 52 of the second component 22 may have a complementary shape, size, and configuration to the rear portion 27 of the first component 20. In the example where the front portion 52 is complementary to the rear portion 53 of the first component 20, the front portion 52 may be multi-faceted to match the multi-faceted surface of the rear portion 27 of the first component 20 to facilitate a stacking or nesting of the components 20, 22 together. Thus, in certain embodiments, the front portion 52 of the second component 22 may have first facets 60 that extend inwardly from the side portions 56, 58. The first facets 60 of the second component 22 may extend generally parallel, and may even contact, when assembled, the first facets 40 of the first component 20. The first facets 60 may extend generally transverse the side portions 56, 58. Further, the front portion 52 of the second component 22 may also have second facets 62, directly connected to the first facets 60, that extend generally rearwardly, and generally transverse the first facets 60. The second facets 62 of the second component 22 may extend generally parallel, and may even contact, when assembled, the second facets 62 of the first component 20. Further yet, the front portion 52 may also have a third facet 64 that transitions from the second facets 62 and extends generally transverse the second facets 62. Similar to the third facet 44 of the first component 20, the third facet 64 of the second component 22 may be generally planar or it may also have additional surfaces.

In certain embodiments, the second facets 62 define a thickness that is approximately equal to a length of the side portions 30, 32 of the first component 20, particularly where the second facets 62 thicken at the lower portion 55. As illustrated, the second facets 62 and the third facet 64 extend inwardly so that the facets 62, 64 comprise just a portion of the width and height of the front portion 52. Each of the facets 60, 62, 64 of the second component 22 may be connected to one another by angled transitions. In some embodiments, the angled transitions may be such as radiused inner and outer corners.

Figure 5:
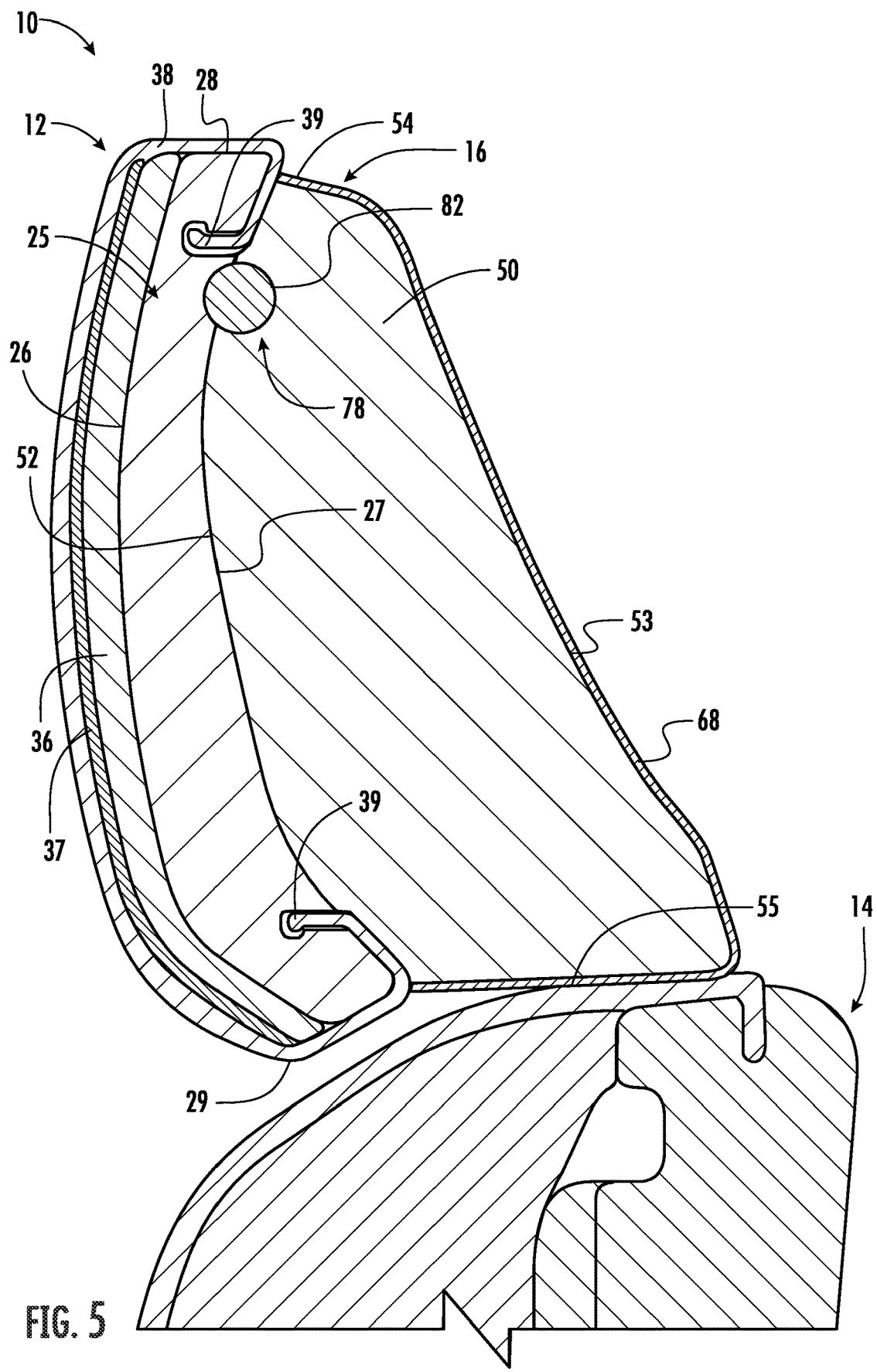
FIG. 5 is a cross-sectional view of the headrest 12 of FIGS. 1-3.

As shown in FIG. 5, the lower portion 55 may extend generally rearwardly to a greater extent than the upper portion 54. The upper and lower portions 54, 55 of the second component 22 may have a complementary shape, size, and configuration to the upper and lower portions 28, 29 of the first component 20. From the above, it can be appreciated that the rear portion 27 of the first component 20 and the front portion 52 of the second component 22 are complementary to one another in terms of size, shape, and configuration. As such, the two components 20, 22 may be stacked or nested entirely or partially with one another. This may provide the headrest 12 with a one-piece appearance.

The rear portion 53 of the second component 22 may generally follow the front portion 52. In some cases, a covering 68 may be applied to at least a portion of the rear and side portions 53, 56, 58, respectively, of the second component 22. As more clearly shown in FIGS. 1-5, the covering 68 may be applied in a continuous fashion entirely across the rear and side portions 53, 56, 58, respectively, of the second component 22. The covering 68 may be such as a coating or a molded thin plastic film, or it may be a wrapped fabric material, or a natural and/or man-made product. In some embodiments, the covering 68 may be scratch and mar resistant. The covering 68 may also be finished in any color, gloss or texture to harmonize with an interior of the vehicle. When the covering 68 is applied a high-quality appearance is achieved.

In certain embodiments, the headrest 12 may include a guide structure 78 configured to facilitate a movement of the headrest 12 relative to the vehicle seat. It should be appreciated that the guide structure 78 may have any shape, size, and configuration as desired. In a non-limiting example depicted in FIG. 2, the guide structure 78 may be a generally U-shaped structure including a pair of spaced-apart posts 80 interconnected by a cross-member 82. The guide structure 78, and more particularly the posts 80, may be configured to cooperate with similarly shaped receptacles 84 disposed in the seat back assembly 14 of the seat 10. In one embodiment, the posts 80 may be located generally adjacent an intersection of the second and third facets 42, 44, respectively. Thus, in some embodiments, the posts 80 may be located inboard from the side portions 30, 32 and the at least one attachment element 39 for the covering 38.

At least one of the posts 80 and the cross-member 82 may be configured such as tubes (hollow) or rods (solid) and constructed of a robust material, such as a metal material, a plastic material, and a composite material, for example. At least a portion of the guide structure 78 may further include a coating (e.g. a zinc plating) deposited thereon to enhance an interaction with the components 20, 22. In certain embodiments, each of the posts 80 and the ross-member 82 may be directly embedded into at least one of the cores 25, 50 of the first and second components 20, 22, respectively. According, in some embodiments, no additional hardware is needed to secure or mount the guide structure 78 within the headrest 12. In another embodiment, the guide structure 78 may be formed integrally with the at least one of the first and second components 20, 22 and as such fixed in place. This advantageously saves weight, and reduces manufacturing complexity, both of which result in cost savings.

In accordance with the provisions of the patent statutes, the present device has been described in what is considered to represent its preferred embodiments. However, it should be noted that the invention can be practiced otherwise than as specifically illustrated and described without departing from its spirit or scope.

What is claimed is:

1. A headrest for a vehicle, comprising:
   at least one component configured to support a head of an occupant, wherein the at least one component is formed of an expanded polypropylene material; and
   a covering wrapped around at least a portion of the at least one component, wherein an attachment of the covering to the at least one component is at least partially embedded into the expanded polypropylene material of the at least one component so that it is hidden from view.

2. The headrest according to claim 1, wherein the at least one component includes a core having a front portion, a rear portion, an upper portion, a lower portion, and a pair of side portions.

3. The headrest according to claim 2, wherein the front portion further includes a concave region formed therein.

4. The headrest according to claim 2, further comprising a cushioning member disposed on the front portion of the at least one component.

5. The headrest according to claim 2, wherein the rear portion includes a plurality of facets formed therein.

6. The headrest according to claim 2, wherein the rear portion includes a pair of first facets, a pair of second facets, and a third facet, wherein each of the second facets connected to a respective one of the first facets, and wherein the third facet is connected to the second facets.

7. The headrest according to claim 1, wherein the covering is formed of at least of a fabric material, a leather material, a man-made material, and a natural material and wherein the covering has two J-shaped end portions embedded in the at least one component.

8. The headrest according to claim 1, further comprising another covering disposed on a remaining portion of the at least one component.

9. The headrest according to claim 1, further comprising a guide structure disposed in the at least one component for coupled to a seat back assembly of the vehicle.

10. A headrest for a vehicle, comprising:
    a first component configured to support a head of an occupant; and
    a second component configured to cooperate with the first component,
    wherein at least one of the first component and the second component is formed of an expanded polypropylene material,
    wherein an attachment of a covering, said covering extending at least partially about the first component, is at least partially embedded in the first component, and
    wherein said first component at least partially nests with the second component.

11. The headrest according to claim 10, wherein at least one of the first component and the second component includes a core having a front portion, a rear portion, an upper portion, a lower portion, and a pair of side portions.

12. The headrest according to claim 11, wherein the front portion of the first component further includes a concave region formed therein.

13. The headrest according to claim 11, further comprising a cushioning member disposed on the front portion of the first component.

14. The headrest according to claim 10, further comprising a covering wrapped around at least a portion of the first component, wherein an attachment of the covering to the first component is hidden from view by a portion of the second component.

15. The headrest according to claim 14, further comprising another covering disposed on a portion of the second component.

16. The headrest according to claim 15, wherein the covering disposed on the portion of the second component is at least one of a coating and a film.

17. The headrest according to claim 10, further comprising a guide structure disposed in at least one of the first component and the second component, wherein the guide structure is configured to couple the headrest to a seat back assembly of the vehicle.

18. A headrest for a vehicle, comprising:
- a first component includes a first core having a first portion and an opposite second portion, wherein the first portion includes a concave region, and wherein a covering is applied over at least the concave region; and
- a second component includes a second core having a first portion and an opposite second portion, wherein a rear portion of the first component nests within a recessed front portion of the second component, wherein the second portion of the second component has a coating disposed thereon, and wherein at least one of the first component and the second component is formed from an expanded polypropylene material,
- and wherein a portion of the covering is at least partially embedded in the polypropylene material of the first component.

* * * * *